Patented Jan. 26, 1926.

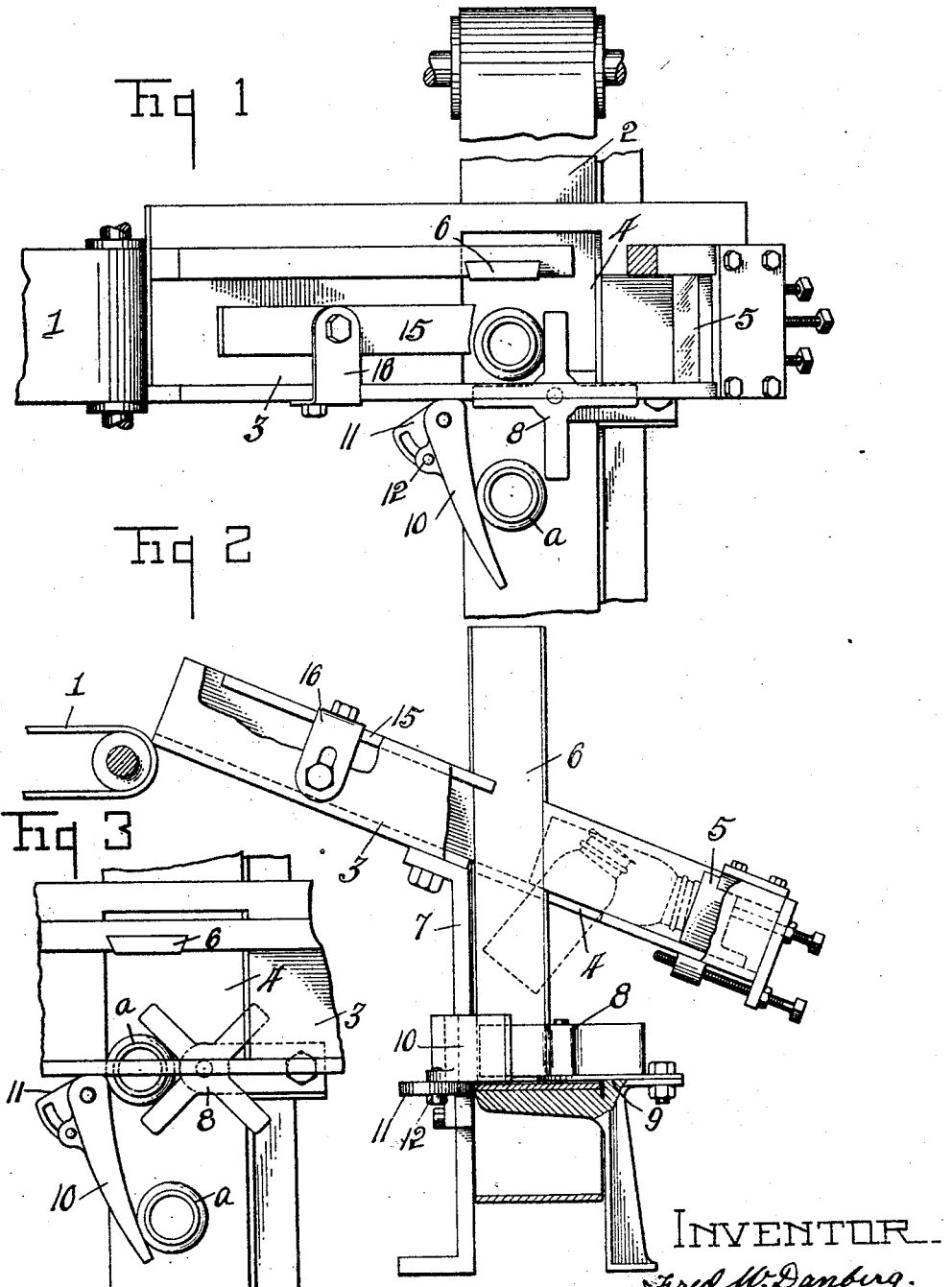

1,570,622

UNITED STATES PATENT OFFICE.

FRED W. DANBERG, OF TOLEDO, OHIO.

ARTICLE-SETTING-UP MEANS.

Application filed October 11, 1922. Serial No. 593,668.

*To all whom it may concern:*

Be it known that I, FRED W. DANBERG, a citizen of the United States, and a resident of Toledo, in the county of Lucas and State of Ohio, have made an invention appertaining to an Article-Setting-Up Means; and I do hereby declare the following to be a full, clear, and exact description of the invention, such as will enable others skilled in the art to which it appertains to make and use the same, reference being had to the accompanying drawing, and to the characters of reference marked thereon, which form a part of this specification.

This invention relates to means for setting up and delivering bottles, jars and the like in upright position to a receiving or carrying away means, and has for its object to add certain features of improvement to the article setting up means described and claimed in my former U. S. Letters Patent No. 1,425,319 dated August 8, 1922.

The invention is fully described in the following specification, and while in its broader aspect it is capable of embodiment in numerous forms, a preferred embodiment thereof is illustrated in the accompanying drawings, in which,—

Figure 1 is a top plan view of an apparatus embodying the invention, with parts broken away and in association with separate fragmentarily shown means for conveying articles to and carrying them away from the setting up apparatus. Fig. 2 is a side elevation thereof with parts broken away, and Fig. 3 is a fragmentary plan view showing the articles partly advanced by the carrying away means from the position shown in Fig. 1.

Referring to the drawings, 1 designates a conveyor belt or other means for carrying articles *a*, such for instance as bottles or jars, in reclining position away from a source of supply, and 2 a conveyor belt or other movable means to which the articles may be delivered in upright position by the setting up mechanism after leaving the conveyor means 1.

The setting up mechanism in which the features embodying the invention reside, comprises a trough-like member 3 which extends downwardly and forwardly on an incline from a point adjacent to the forward or delivery end of the conveyor means 1 to receive the articles as they pass from said means, the articles then passing down the trough 3 by gravity partly across an opening 4 in the bottom thereof adjacent to the forward lower end of the trough and strike at their forward ends against a bumper-block 5, which is adjustably mounted in the forward end portion of the trough. As the article strikes the bumper block 5 the rear end thereof projects a sufficient distance over the opening 4 to overbalance the article and cause it to fall backward and downward through the opening 4 and in upright position on the conveyor 2 as described in my said former Letters Patent.

In the use of the construction shown in said former Letters Patent it has been found that where small bottles or jars are being acted on, many of them would topple over upon striking the conveyor 2. To overcome this objection a guide 6 is extended down from the side of the trough 3 opposed to the side of the trough under which the articles move in being carried away by the conveyor 2, such guide extending at its lower end adjacent to the conveyor 2 to adapt it to prevent the article from toppling over in the direction of the guide. The trough 3 is supported by a bracket arm 7, which extends up at the rear side of the conveyor 2 and opening 4 of the trough in position to cooperate with the guide 6 to assist in preventing an article toppling over as it falls down in upright position onto the conveyor 2 through the trough opening.

In addition to the provision of the guides 6 and 7, a spider-form of wheel 8, having a plurality of radiating arms, is mounted for horizontal turning movements on a bracket 9 overhanging the conveyor 2, the axis of the wheel being disposed below the side portion of the trough from which the articles pass from the conveyor 2 and near the forward edge of the conveyor, or, in other words, in diagonally opposed relation to the angle formed by the guide members 6 and 7. The wheel 8 is preferably provided with four equidistantly spaced radiating arms, two of which stand longitudinally and two transversely of the conveyor 2 when the wheel is in article receiving position, as shown in Fig. 1. When the wheel is in this position an adjoining pair of arms thereof cooperate with the guide members 6 and 7 to form a substantially rectangular pocket into which the article drops from the trough and serve to brace the article against toppling over.

In practice the conveyor 2 is continually moving and as soon as an article drops onto the same the article is carried along thereby and moved out of register with the opening 4 of the trough to permit the next article passing down the chute to drop onto the conveyor. The movement of the article with the conveyor causes a quarter turning of the wheel 8, and during such turning action the article is engaged between two arms of the wheel and the guide 7, as well as the guard arm 10, which overhangs the conveyor and forms a continuation of the side of the guide 7 in the direction of movement of the conveyor. The guide arm 10 is carried by a bracket 11 projecting from the standard 7 and is pivoted thereto for horizontal adjustment to adapt it to be placed in proper position with respect to the wheel 8 to suit the diameter of the article. The guide arm is secured in adjusting relation to the bracket 11 by a suitable clamping means 12. The adjustment of the arm 10 should be such that the article $a$ as it passes from engagement with the wheel under the moving action of the conveyor 2, will leave the wheel with two of the arms thereof extending lengthwise or in substantial parallel relation to the longitudinal axis of the conveyor and two of them extending transversely of the conveyor, as shown in Fig. 1, thus leaving a pocket of the wheel in proper article receiving relation to the guides 6 and 7 after a dropping of each article onto the conveyor. It will be understood that the speed of movement of the conveyor 2 should be suited to the speed of feeding of successive articles down the trough so that an article which has dropped onto the conveyor 2 will have moved a sufficient distance from under the trough to have imparted a complete quarter turn to the wheel 8 by the time a succeeding article drops onto the conveyor.

It is evident in the operation of the apparatus that the conveyor 2 moves an article $a$, which is dropped thereon and that the article in turn imparts movement to the bracing wheel 8, and that the bracing wheel cooperates with the guides 6 and 7 to form a four-sided pocket or bracing means for the article and remains in contact with the article during a predetermined portion of the movement of the article from setting-up position, thereby acting as a steadying means for the article which continues in engagement therewith until the article has been steadied on the conveyor.

Another feature of the invention consists in providing a member 15 over the trough 3 to the rear of the opening 4 which permits an article to pass freely thereunder down the trough but remains in coacting relation to the article until its forward end has passed completely over the opening 4. The purpose of the member 15 is to maintain an article in parallel relation to the trough until its forward end has passed over the opening 4 so as to prevent any possibility of the nose portion of the article tipping down into the opening 4 and striking the forward wall of such opening, thereby interrupting the feed of articles through the opening and usually causing a piling up of the articles. The member 15, in the present instance, is of bar form and carried by a bracket arm 16 that is adjustably secured to a side of the trough 3 to permit adjustment of the member to suit the cross-sectional size of the articles to be acted on.

I wish it understood that my invention is not limited to any specific construction, arrangement, or form of the parts, as it is capable of embodiment in numerous forms without departing from the spirit of the claims.

Having thus described my invention, what I claim as new, and desire to secure by Letters Patent, is,—

1. The combination with a chute down which articles move by gravity in reclining position and having an opening over which an article partially passes, and a bumper in advance of the opening with which the forward end of the article engages to stop its forward movement and cause it to fall backward and downward through the opening in setting up position, of a guide member disposed over a portion of the trough for coacting with an article to prevent the forward end of the article tipping down into the opening as it passes over the same.

2. The combination with a chute down which articles move by gravity in reclining position and having an opening over which an article partially passes, and a bumper in advance of the opening with which the forward end of the article engages to stop its forward movement and cause it to fall backward and downward through the opening in setting up position, of a bar-like member disposed over the trough at the rear of the opening and coacting with the top of each article to prevent the forward end of the same tipping down into the opening as it passes over the same, and means for adjustably connecting the member to the trough.

3. The combination with a continuously moving conveyor, and means for guiding successive articles to a position over the conveyor and then permitting a dropping of the same in upright position on the conveyor, of a rotatable member having pockets for successively receiving articles as they drop on the conveyor, guide means cooperating with said rotatable member for preventing articles toppling as they drop onto the conveyor, said guide means including an adjustable arm extending approximately parallel with said conveyor and adapted to cooperate with an article as it passes from engagement with said rotatable member to place said member in predetermined article receiving position.

In testimony whereof I have hereunto signed my name to this specification.

FRED W. DANBERG.